UNITED STATES PATENT OFFICE.

MARY L. FISHER, OF KANSAS CITY, MISSOURI.

REMOVABLE COLORING-MATTER FOR WASHABLE FABRICS.

SPECIFICATION forming part of Letters Patent No. 721,290, dated February 24, 1903.

Application filed April 30, 1900. Serial No. 14,823. (No specimens.)

*To all whom it may concern:*

Be it known that I, MARY L. FISHER, a citizen of the United States, and a resident of Kansas City, in the county of Jackson and State of Missouri, have invented a new and useful Removable Coloring-Matter for Washable Fabrics, of which the following is a specification.

My composition consists of the following ingredients combined in the proportions stated, viz: acid pink, one ounce; gum-senegal, five ounces; extract fustic, four ounces; gum-arabic, four ounces; Teeman's soluble blue, nine ounces; gum-senegal, seven ounces. These ingredients should be thoroughly mingled by agitation.

In using the above-named composition the fabrics to be tinted should first be freed from soil of every description. The ingredients are to be dissolved in a sufficient quantity of pure clear water, when the fabrics are dipped or rinsed therein. The six ingredients described may be used in twos, as above indicated, with varying results, as follows—that is, the acid pink and the gum-senegal when dissolved in a sufficient quantity of water will produce a pink tint; the next two following the first two a yellow tint will be the result; the next two following the first four mentioned a blue tint will be the result; but when I combine the six ingredients mentioned dissolved in a suitable quantity of water I can attain a dark or black tint.

I am aware that the ingredients above described are not new or unknown; but I am not aware that they have ever been used in the proportions of which I use them and for the purposes herein designated.

What I claim, and desire to secure by Letters Patent of the United States, is—

The combination, comprising acid pink, gum-senegal dissolved in water, intermingled with extract of fustic, gum-arabic, Teeman's soluble blue added, to be thoroughly mingled with the first three ingredients mentioned, for tinting textile fabrics, substantially as described.

In testimony whereof I affix my signature in the presence of two witnesses.

MARY L. FISHER.

Witnesses:
 M. L. LANGE,
 MARY N. HIGDON.